United States Patent
Hulke et al.

(10) Patent No.: US 12,218,987 B2
(45) Date of Patent: **\*Feb. 4, 2025**

(54) TRANSITION OF USER EQUIPMENT TO A 5GC NETWORK POST VOICE CALL TERMINATION IN VIEW OF EPS FALLBACK

(71) Applicant: Cisco Technology, Inc., San Jose, CA (US)

(72) Inventors: Gitesh Tejrao Hulke, Maharashtra (IN); Snezana Mitrovic, Leefdaal (BE); Rafiya Bano Sheikh, Maharashtra (IN); Sumana Ganne, Bangalore (IN); Vinay Saini, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,097

(22) Filed: Nov. 22, 2023

(65) Prior Publication Data

US 2024/0098609 A1 Mar. 21, 2024

Related U.S. Application Data

(63) Continuation of application No. 17/497,525, filed on Oct. 8, 2021, now Pat. No. 11,889,294.

(51) Int. Cl.
*H04L 65/1016* (2022.01)
*H04W 8/22* (2009.01)
(Continued)

(52) U.S. Cl.
CPC .......... *H04L 65/1016* (2013.01); *H04W 8/22* (2013.01); *H04W 36/00226* (2023.05); *H04W 60/04* (2013.01); *H04W 36/324* (2023.05)

(58) Field of Classification Search
CPC . H04W 36/32; H04W 8/22; H04W 36/00837; H04W 60/04; H04W 36/165; H04W 36/0022; H04L 65/1016
See application file for complete search history.

(56) References Cited

U.S. PATENT DOCUMENTS 11,889,294 B2 * 1/2024 Hulke .................... H04W 8/22
2019/0059026 A1 2/2019 Huang-Fu et al.
(Continued)

FOREIGN PATENT DOCUMENTS

WO 2020160177 A1 8/2020

OTHER PUBLICATIONS

Cisco Systems: "Corrections to EPS to SGS Mobility for Idle-mode Mobility", 3GPP Draft, 23502_CR0741R1_5GS_PH1_(REL-15)_S2-1810834_WAS_10187_23502CR0741_EPS to 5GS Idle Mode Mobility Missing Steps V0.4, 3GPP, Mobile Competence Centre, 650, vol. SA WG2, No. Dongguan, China, Oct. 15, 2018-Oct. 19, 2018, Dec. 4, 2018, 5 Pages, XP051491244, The Whole Document.

(Continued)

*Primary Examiner* — Eric Myers
(74) *Attorney, Agent, or Firm* — Polsinelli P.C.

(57) ABSTRACT

Systems and methods are provided for providing transference of a user equipment to a 5G network when a voice call is terminated. The systems and method can include receiving, at a mobility management entity, a voice call termination message from a serving gateway, determining, by the mobility management entity, whether the user equipment includes a 5G subscription and 5G capability based on the voice call termination message, and providing, by the mobility management entity, a handover message to the user equipment to initiate a handover to the 5G network based on the determining of whether the user equipment includes the 5G subscription and 5G capability.

20 Claims, 11 Drawing Sheets

(51) Int. Cl.
  *H04W 36/00*    (2009.01)
  *H04W 36/32*    (2009.01)
  *H04W 60/04*    (2009.01)

(56) References Cited

U.S. PATENT DOCUMENTS

| | | |
|---|---|---|
| 2019/0191349 A1 | 6/2019 | Kim et al. |
| 2019/0335534 A1 | 10/2019 | Atarius et al. |
| 2020/0015128 A1 | 1/2020 | Stojanovski et al. |
| 2020/0275332 A1 | 8/2020 | Chong et al. |
| 2020/0383010 A1 | 12/2020 | Zhu et al. |
| 2022/0330104 A1 | 10/2022 | Lee et al. |

OTHER PUBLICATIONS

Intel: Solution for Mobility in the EPC=5GC Direction, S2-173622, Revision of S2-173522, 3GPP TSG SA WG2 Meeting #121, 3rd Generation Partnership Project, Mobile Competence Centre, 650, Route Des Lucioles, F-06921 Sophia-Antipolis Cedex, France, SA WG2, Hangzhou, May 15, 2017-May 19, 2017, May 14, 2017, pp. 1-4.

International Search Report and Written Opinion for International Application No. PCT/US2022/077515, mailed Jan. 26, 2023, 16 Pages.

Nokia et al., "Corrections on EPS to 5GS Handover with AMF Re-allocation", 3GPP Draft, S2-2101301.ZIP, S2-2101303, 3rd Generation Partnership Project (3GPP), Mobile Competence Centre, 650, Route Des Lucioles, F-06921 Sophia-Antipolis Cedex, France, vol. SA WG2, No. Elbonia, Feb. 24, 2021-Mar. 9, 2021, Mar. 3, 2021, 9 Pages, XP051982934, The Whole Document.

Qualcomm Incorporated: "Addition of TAU Trigger for Change of NG-RAN Radio Capability", 3GPP Draft, 24301_CR3094_(REL-15)_C1-18515, 3GPP, Mobile Competence Centre, 650, Route Des Lucioles, F-06921 Sophia-Antipolis Cedex, France, vol. CT WG1, No. West Palm Beach, FL(USA), Aug. 20, 2018-Aug. 24, 2018, Sep. 3, 2018, XP051570542, The Whole Document.

\* cited by examiner

TRANSITION OF USER EQUIPMENT TO A 5GC NETWORK POST VOICE CALL TERMINATION IN VIEW OF EPS FALLBACK

CROSS-REFERENCE TO RELATED APPLICATION

This application is a Continuation of U.S. Non-Provisional patent application Ser. No. 17/497,525 filed on Oct. 8, 2021, entitled "TRANSITION OF USER EQUIPMENT TO A 5GC NETWORK POST VOICE CALL TERMINATION IN VIEW OF EPS FALLBACK" the entire contents of which are hereby expressly incorporated by reference in their entirety.

TECHNICAL FIELD

The subject matter of this disclosure relates in general to the field of wireless communication, and more particularly to providing transference of a 5G capable user equipment (UE) with a 5G subscription to a 5G network once an internet protocol multimedia subsystem ("IMS") voice call is terminated.

BACKGROUND

Wireless communications systems are deployed to provide various telecommunications and data services, including telephony, video, data, messaging, and broadcasts. A fifth-generation (5G) mobile standard calls for higher data transfer speeds, greater number of connections, and better coverage, among other improvements. The advantages offered by a 5G network can be leveraged by private industries that are driving the deployment of private networks, which may also be referred to as Standalone Non-public Networks (SNPNs) or Public Network Integrated Non-Public Networks (PNI-NPNs).

In some cases, a wireless device can be configured to operate on multiple wireless networks. For example, a wireless device can be configured to operate on a private network (e.g., an NPN) as well as a public network that is operated by a mobile network operator (MNO). In some examples, the wireless device may be configured to use different network identities that are associated with the different wireless networks. A wireless network can use the network identity associated with a wireless device to provide short message service (SMS) (e.g., text messages) to the wireless device.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1A:
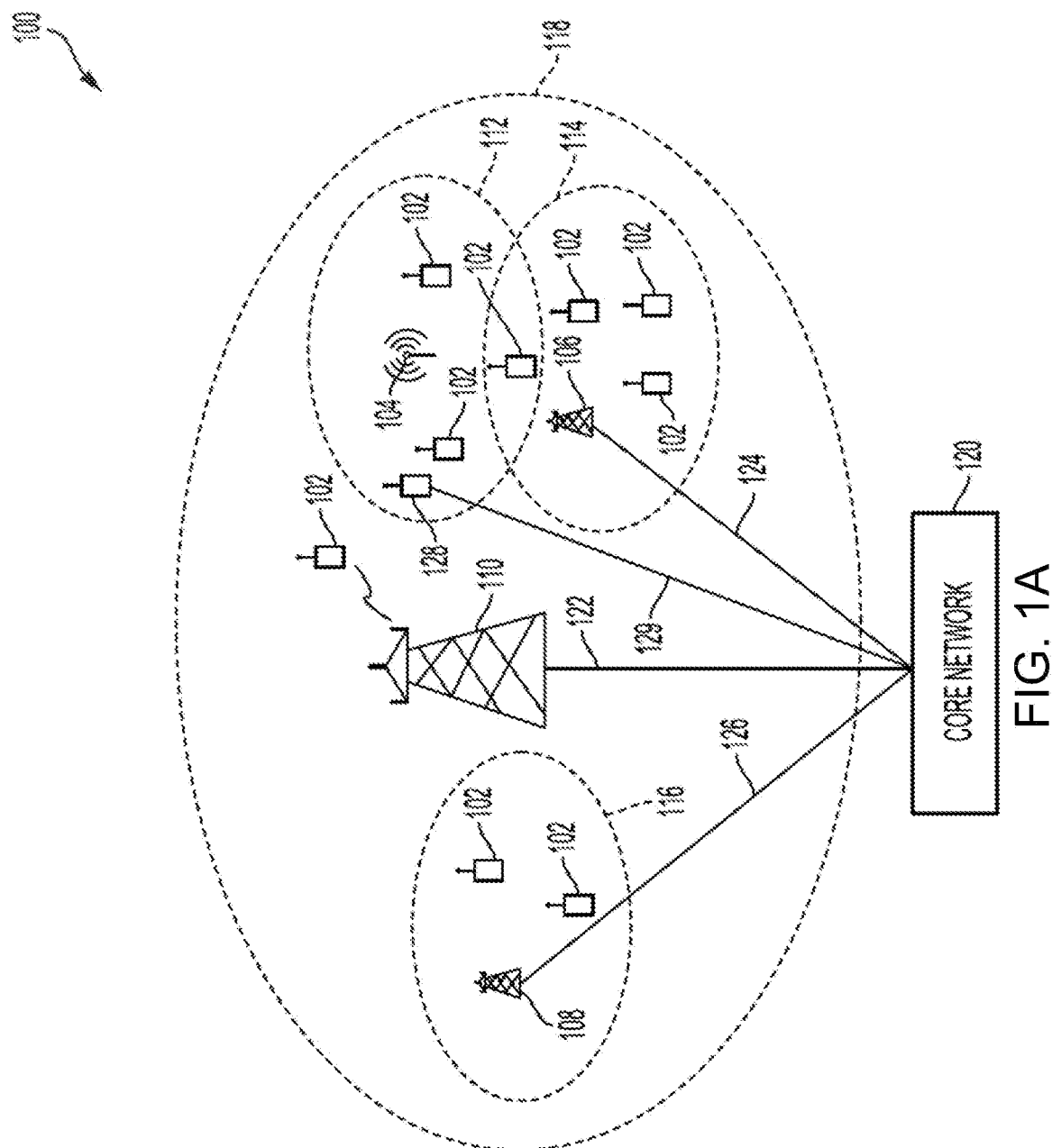
FIG. 1A illustrates an example network architecture, in accordance with an embodiment of the present disclosure.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods are included for providing transference of a user equipment to a 5G network when a voice call is terminated. For example, the systems and method can include receiving, at a mobility management entity, a voice call termination message from a serving gateway, determining, by the mobility management entity, whether the user equipment includes a 5G subscription and 5G capability based on the voice call termination message, and providing, by the mobility management entity, a handover message to the user equipment to initiate a handover to the 5G network based on the determining of whether the user equipment includes the 5G subscription and 5G capability.

Example Embodiments

A wireless device can include devices such as a mobile phone, router, tablet computer, laptop computer, consumer asset tracking device, wearable device (e.g., a smart watch, glasses, an XR device, etc.), Internet of Things (IoT) device, a vehicle (or a computing device of a vehicle), and/or another device used by a user to communicate over a wireless communications network. In some instances, a wireless device can be referred to as user equipment (UE), such as when referring to a wireless device configured to communicate using 5G/New Radio (NR) or other telecommunications standard.

In some cases, a wireless device be configured to operate on a private network as well as a public network (e.g., a network operated by a mobile network operator (MNO)). For example, the wireless device can have different network identities that can be used to associate with each corresponding network. Messages (e.g., SMS messages) that are directed to the wireless device using one of its network identities may be lost or delayed if the wireless device is not registered to the corresponding network. For example, if a message is sent to the network identity that the wireless device uses to associate with a private enterprise network, the message will not be delivered if the wireless device is registered to a public network (e.g., the message cannot be delivered because the device is not connected to the private network). Similarly, if a message is sent to the network identity that the wireless device uses to associate with a public network, the message will not be delivered if the wireless device is registered to a private network (e.g., the message cannot be delivered because the device is not connected to the public network).

Figure 1B:
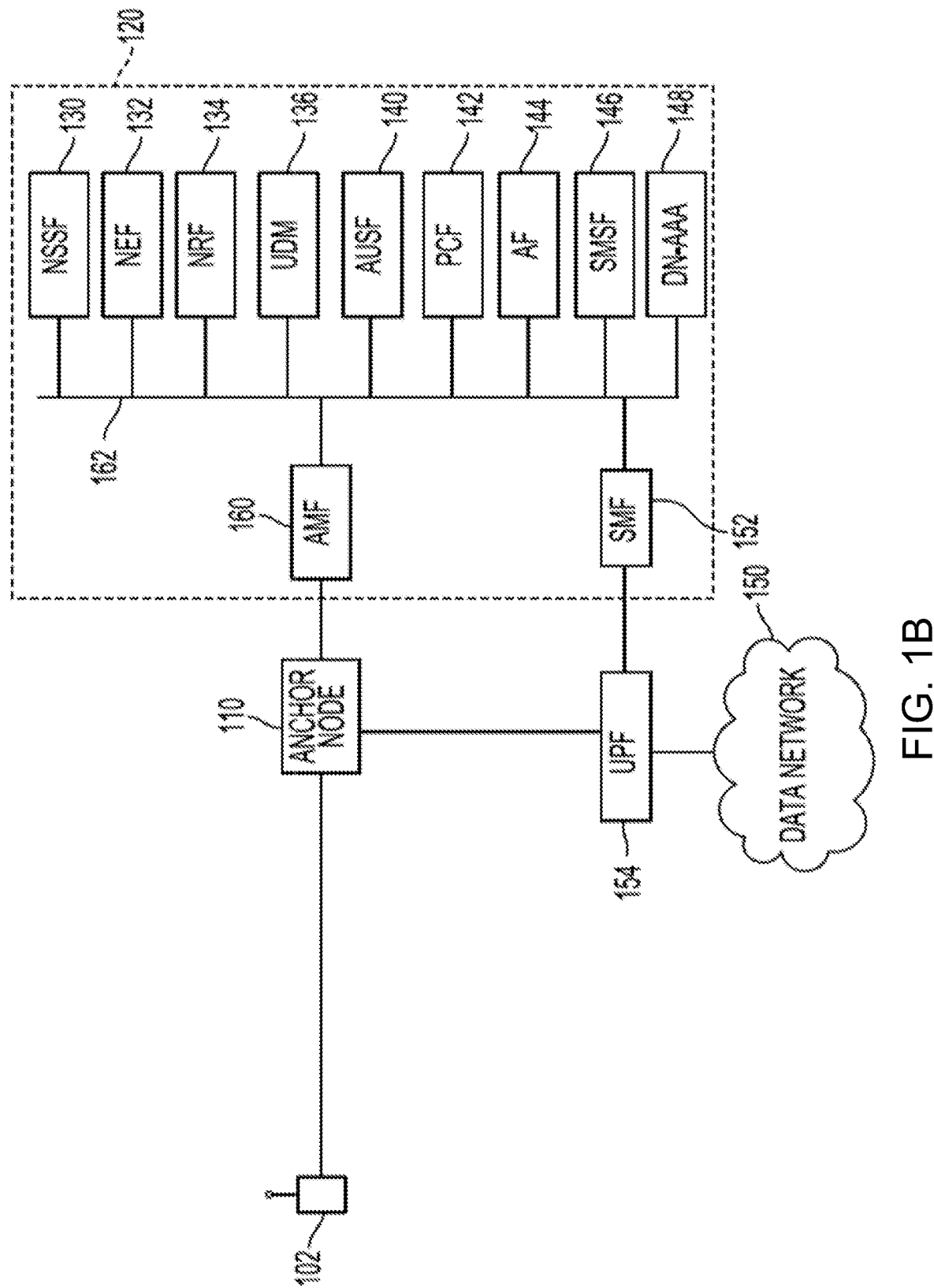
FIG. 1B illustrates an example network architecture, in accordance with an embodiment of the present disclosure.

FIGS. 1A and 1B illustrate an example of network architecture and associated components, according to an aspect of the present disclosure. As shown in FIG. 1A, network 100 is a 5G wireless communication network. Network 100 can include a number of user equipment (UE) 102. UEs 102 can be any type of known or to be developed device capable of establishing communication over a wireless/radio access technology with other devices. Examples of UEs 102 include, but are not limited to, various types of known or to be developed smart phones, laptops, tablets, desktop computers, Internet of Things (IoT) devices, etc.

UEs 102 can have multiple different radio access technology (RAT) interfaces to establish a wireless communication session with one or more different types of base stations (nodes) that operate using different RATs with network 100. For example, a UE 102 can have a 5G interface as well as a 4G interface. Therefore, such UE 102 can be, from time to time and as the need may arise, be handed over from a 5G network to a neighboring 4G network and vice-versa.

Network 100 may also include nodes 104, 106, 108 and 110. Nodes 104, 106, 108 and 110 can also be referred to as base stations or access points 104, 106, 108 and 110. For example, node 104 can be a WiFi router or access point providing a small cell site or coverage area 112 for several of the UEs 102 therein. Therefore, node 104 may be referred to as a small cell node. Nodes 106 and 108 can be any one of various types of known or to be developed base stations providing one or more different types of Radio Access Networks (RANs) to devices connecting thereto. Examples of different RANs include, but are not limited to, Global System for Mobile Communication (GSM), General Packet Radio Service (GPRS)/Enhanced Data Rates for GSM Evolution (EDGE), Universal Mobile Telecommunications System (UMTS), Long-Term Evolution (LTE), LTE-advanced, Worldwide Interoperability for Microwave Access (WiMAX), WiFi, Code Division Multiple Access (CDMA), Evolution-Data Optimized (EV-DO), IS-95 etc.

Node 106 can provide coverage area 114 for end points 102 within coverage area 114. As shown in FIG. 1A, one or more UEs 102 can be located on an overlapping portion of coverage areas 112 and 114. Therefore, such one or more UEs 102 can communicate with node 104 or node 106.

Furthermore, node 108 can provide coverage area 116 for some of UEs 102 in coverage area 116. Node 110 can provide coverage area 118 for all UEs 102 shown in FIG. 1A.

Within the 5G structure of network 100, nodes 104, 106, 108 and 110 may operate in a connected manner to expand the coverage area provide by node 110 and/or to serve more UEs 102 than node 110 or some of the nodes 104, 106, 108 and 110 can handle individually. Node 104 may be communicatively coupled to node 106, which may in turn be communicatively coupled to node 110. Similarly, node 108 can be communicatively coupled to node 106 and/or node 110. Node 104 and node 106 can communicate with node 110 via any known or to be developed wireless communication standard. Also, node 108 can communicate with node 110 via any known or to be developed wireless communication standard.

Within network 100, node 110 can have a wired connection to core network 120 via, for example, fiber optics cables. This may be referred to as backhaul 122 or backhaul connection 122. While fiber optic cables are an example of a connection medium for backhaul 122, the present disclosure is not limited thereto and the wired connection can be any other type of know or to be developed wire.

Furthermore, each of nodes 106, 108 and 110 can include any type of base station such as a next generation or 5G e-NodeB, which may also be referred to a global NodeB (gNB). Each of nodes 106 and 108 can have separate backhaul connections 124 and 126 to core network 120. Connections 124 and 126 can be the same as backhaul connection 122. In an example, where node 104 is a WiFi node, node 104 can connect to Core network 122 via a node 128, which can be a N3 Interworking Function (N3IWF) node. Connection 129 between node 128 and Core network 120 can be the same as backhaul connection 122.

FIG. 1B illustrates another example architecture with components of core network 120 of FIG. 1A, according to an aspect of the present disclosure. A simplified version of network 100 is shown in FIG. 1B, where a single UE 102 has a wireless communication session established with base station 110. Base station 110 is in turn connected to core network 120 via backhaul 122.

Furthermore, FIG. 1B illustrates example logical components of core network 120. Example components/nodes of core network 120 include various network functions implemented via one or more dedicated and/or distributed servers (can be cloud based). Core network 120 of 5G network 100 can be highly flexible, modular and scalable. It can include many functions including network slicing. It offers distributed cloud-based functionalities, Network functions virtualization (NFV) and Software Defined Networking (SDN).

For example, core network 120 can include Application and Mobility Management Function (AMF) 160, with which base station 110 communicates (e.g., using an N2 interface). Core network 120 further has a bus 162 connecting various servers providing different example functionalities. For example, bus 162 can connect AMF 160 to Network Slice Selection Function (NSSF) 130, Network Exposure Function (NEF) 132, Network Repository Function (NRF) 134, Unified Data Management (UDM) 136, Authentication Server Function (AUSF) 140, Policy Control Function (PCF) 142, Application Function (AF) 144, Short Message Service Function (SMSF) 146, Data Network Authentication, Authorization, and Accounting (DN-AAA) 148 function/server, and Session Management Function (SMF) 152. In some aspects, one or more of the functions or components illustrated may be outside of core network 120 (e.g., DN-AAA 148 can be outside core network 120).

In one example, a node serving as SMF 152 may also function as a control plane Packet Gateway (PGW-C) node. Various components of core network 120, examples of which are described above, provide known or to be developed functionalities for operation of 5G networks including, but not limited to, device registration, attachment and authentication, implementing network policies, billing policies, etc.

Furthermore, as shown in FIG. 1B, SMF 152 is connected to User Plane Function (UPF) 154, which in turns connects core network 120 and/or UE 102 (after authentication and registration with core network 120) to data network (DN) 150. In one example, a node serving as UPF 154 may also function as a user plane Packet Gateway (PGW-C) node and/or a user plane Serving Gateway (SGW-U) node.

While FIG. 1B illustrates an example structure and components of core network 120, the present disclosure is not limited thereto. Core network 120 can include any other number of known or to be developed logical functions and components and/or can have other known or to be developed architecture.

For purposes of illustration and discussion, network 100 has been described with reference to a limited number of UEs 102, nodes 104, 106, 108, 110, etc. However, inventive concepts are not limited thereto.

Furthermore, while certain components have been illustrated and described with reference to FIGS. 1A and 1B, network 100 can include any other known or to be developed elements or components for its operation.

In Control Plane and User Plane Separation ("CUPS") architecture, traffic handling and usage counting can occur at user plane function (UPF), and usage can be relayed to a session management function (SMF) by the UPF pursuant to usage reporting rules (URR). The URR usage can also be relayed by the SMF to a charging function ("CHF"). The SMF can initially generate URRs and associate them with a packet detection rule (PDR). Traffic can then be processed under the PDR and its usage accounted for via the URR at the UPF.

Figure 2:
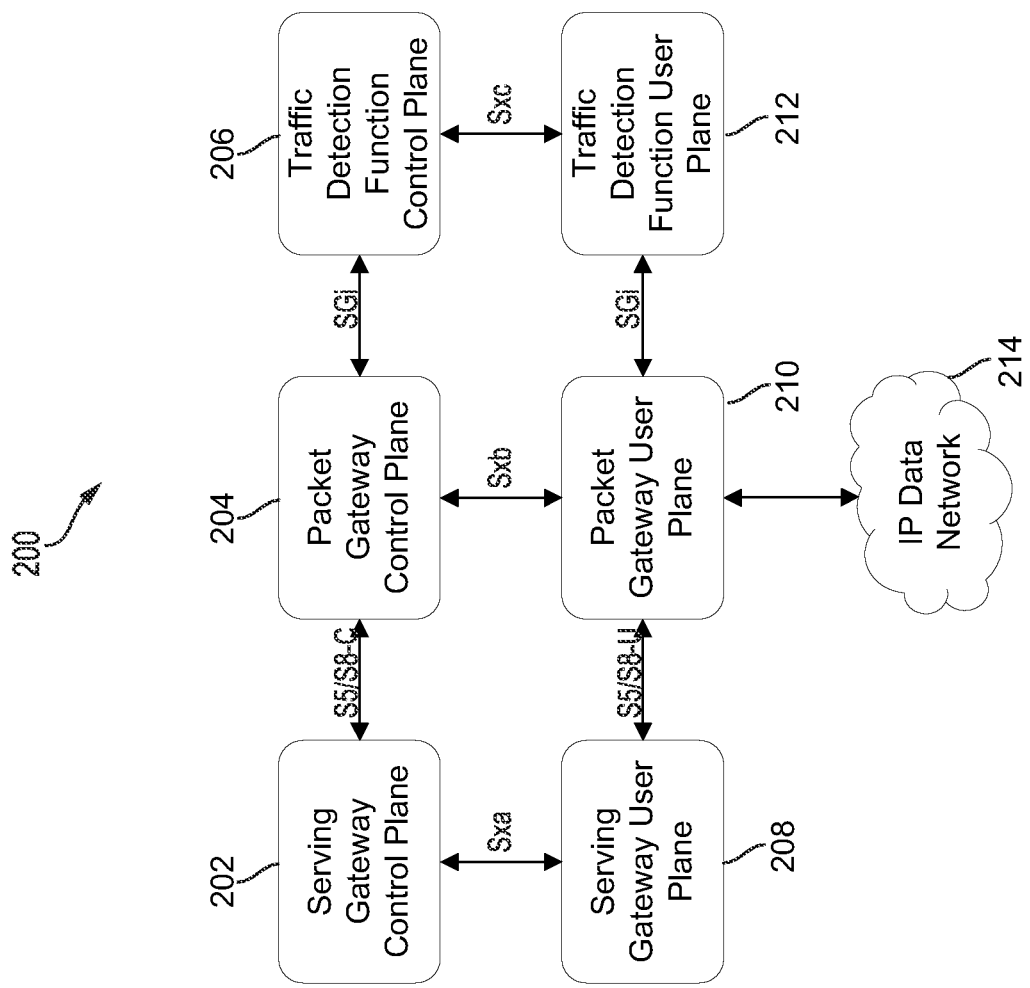
FIG. 2 illustrates an example Control and User Plane Separation network architecture, in accordance with some embodiments.

FIG. 2 illustrates an example Control and User Plane Separation (CUPS) network architecture 200, in accordance with some embodiments. The CUPS network architecture 200 can include a serving gateway control plane ("SGW-C") 202, a packet gateway control plane ("PGW-C") 204, a traffic detection function control plane ("TDF-C") 206, a serving gateway user plane ("SGW-U") 208, a packet gateway user plane ("PGW-U") 210, a traffic detection function user plane ("TDF-U") 212, and an IP data network 214.

The CUPS network architecture 200 can allow mobile operators to separate the control plane and user plane of their network (e.g., Evolved Packet Core (EPC)). This capability can deliver the ability to scale each network plane independent of one another, promoting a more cost-effective approach to core mobile architecture, and future-proofing the network for 5G. With CUPS, an existing serving gateway ("SGW"), packet gateway ("PGW"), and serving architecture evolution gateway ("SAEGW") can be separated into SGW-C, PGW-C, and SAEGW-C for the control plane and SGW-U, PGW-U, and SAE-GWU for the user plane. The CUPS network architecture 200 can include features such as: independent scalability of the control and user planes; ability to specialize the user plane for key applications; 5G readiness; lower backhaul costs; traffic offload; new use-case enablement; and multi-level CUPS offerings.

In some implementations, the CUPS network architecture 200 can include various interfaces that connect the control planes and the user planes. For example, the SGW-C 202 can be connected to the PGW-C 204 via an S5/S8-C interface. The PGW-C 204 can be connected to the TDF-C 206 via an SGi interface. The TDF-C 206 can be connected to the TDF-U 212 via an Sxc interface. The TDF-U 212 can be connected to the PGW-U 210 via an SGi interface. The PGW-U 210 can be connected to the SGW-U 208 via an S5/S8-U interface, the PGW-U 210 can be connected to the PGW-C 204 via an Sxb interface, and the SGW-U 208 can be connected to the SGW-C 202 via an Sxa interface.

Figure 3:
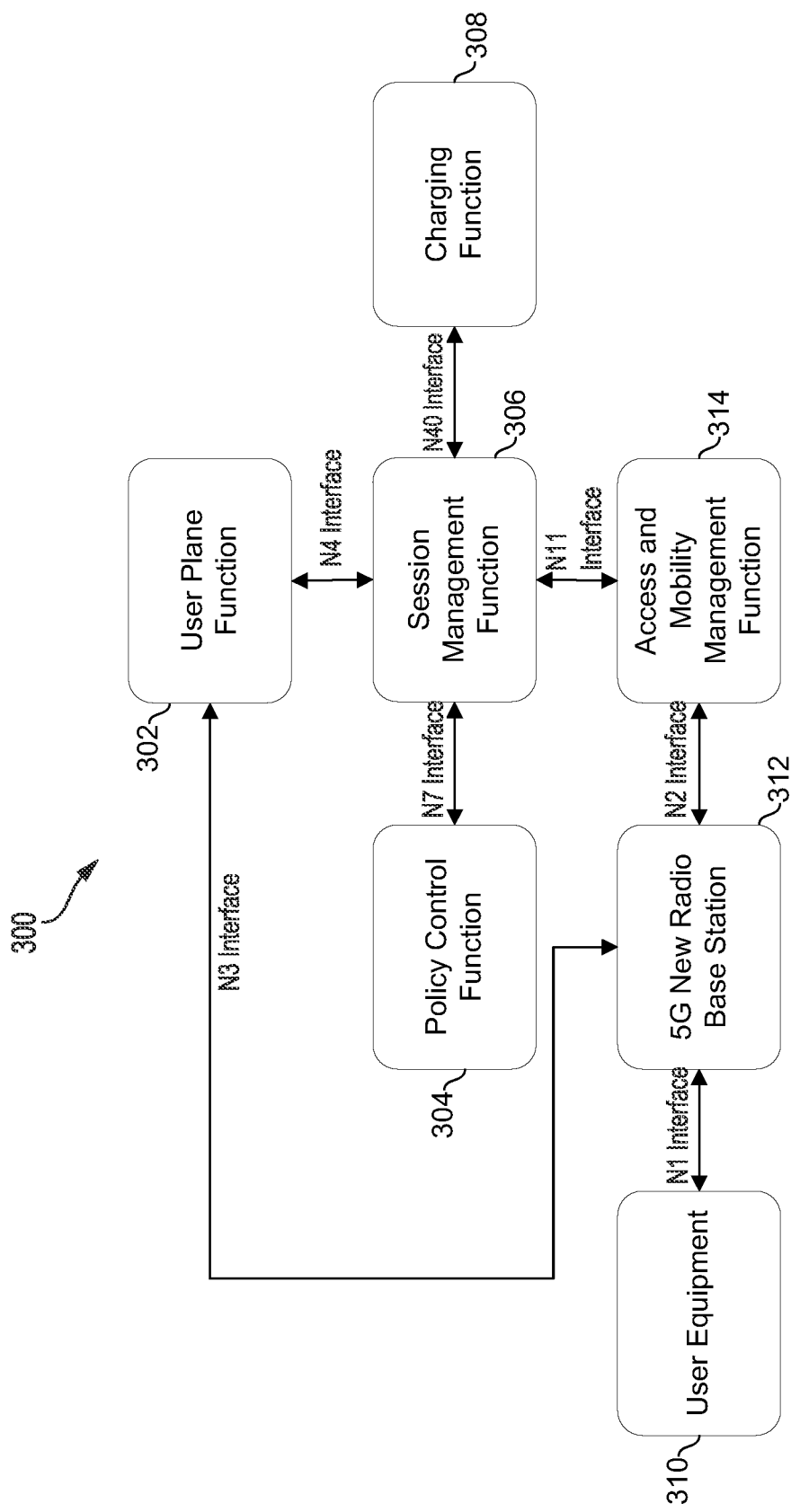
FIG. 3 illustrates an example Control and User Plane Separation network architecture, in accordance with some embodiments.

FIG. 3 illustrates an example Control and User Plane Separation (CUPS) network architecture 300, in accordance with some embodiments. The CUPS network architecture 300 can include a user plane function (UPF) 302, a policy control function (PCF) 304, a session management function (SMF) 306, a charging function ("CHF") 308, a user equipment (UE) 310, a 5G new radio base station ("gNB") 312, and an access and mobility management function ("AMF") 314.

In some implementations, The UPF 302 can be connected to the SMF 306 via an N4 interface. The PCF 304 can be connected to the SMF 306 via an N7 interface. The SMF 306 can be connected to the CHF 308 via an N40 interface. The SMF 306 can be connected to the AMF 314 via an N11 interface. The AMF 314 can be connected to the gNB 312 via an N2 interface. The gNB 312 can be connected to the UE 310 via an N1 interface. The UPF 302 can be connected to the gNB 312 via an N3 interface.

In other implementations, the CUPS network architecture 300 can utilize a customized feature. Initially, the CUPS network architecture 300 can include the SMF 306 and the UPF 302 exchanging information regarding existing supported features that may be facilitated by a node level message exchange between the SMF 306 and the UPF 302. The node level messages can include information relating to information elements (IE) such as a control plane (CP) 306 (e.g., the session management function 306) and a user plane (UP) 302 (e.g., the user plane function 302) supported features. For example, the node level messages can include a bit map and node advertisements if the feature is supported by the node.

The CUPS network architecture 300 can provide an operator with control to achieve charging services for offline when there is no time or volume reporting that is required. In absence of this, if the operator wants usage information in a CC event, a URR Deletion, or Call Deletion, the operator would have to provide a mandatory configuration with volume/time limits. The CUPS network architecture 300 provides the added benefit where an operator is not interested in receiving timely reports, but rather, is expected to receive a report when a charging event occurs, when a charging service is removed, or when a call is deleted. The CUPS network architecture 300 can lower congestion and CPU overhead.

A UPF may need a URR (e.g., per rating group (RG)/svcID bucket) to count for RG/svcid usage. Previous configurations may not allow generation of an offline URR without a volume or time threshold trigger for periodic reporting. There would be many instances where an operator is not interested in periodic volume or time based reporting, but rather, the operator would like to receive usage data per RAT type or location. For example, short audio calls such as calls to an automated helpline, etc.; and Internet-of-Things (IoT) devices such as connected cars where data volume is not significant but UE mobility and differential charging based on RAT type/PLMN may be needed.

In other implementations, the CUPS network architecture 300 may not add a new message or IE at a per session level to increase the traffic/chattiness on the N4 interface. The CUPS network architecture 300 can generate a URR at the UPF 302 without any volume/time thresholds, thereby reducing messages across the N4 interface. In some examples, the UPF 302 may need URR buckets to be generated per RG and service ID. The UPF 302 may not be able to generate a default bucket on its own without the SMF 306 on the N4 interface since RG and service ID may not be known to the UPF 302, which is known by the SMF 306 and the CHF 308.

In a 5G network, if Voice over New Radio (VoNR) is not supported due to the lack of radio resources, if all features for VoNR are not implemented by a user equipment (UE), or if the UE is in an area where a new radio (NR) is not configured for voice calls, a network operator can support voice calls for single registration mode UEs by using evolved packet system (EPS) Fallback and leverage an existing evolved packet core (EPC) network.

However, there is no procedure in which the UE can instantly register back to the 5G network once the voice call is terminated. This can result in a subscriber (e.g., UE) remaining connected to an LTE network until the UE initiates a Registration Request to switch to the 5G network, which is inefficient and time consuming.

The overall experience of a 5G user can be impacted after making a voice call because the 5G user may be "stuck" on an LTE network when the 5G user has 5G capabilities and a 5G subscription. For example, a user subscribed to 5G with a 5G capable single-registration mode UE is left on the LTE network until the UE initiates a registration procedure due to mobility, if the UE updates its capabilities or protocol parameters, or to request a change of a set of network slices. None of these scenarios immediately occur if the user stays in the same registration area or does not change its capabilities or protocol parameters, which a problem. All contributing to the inability of the UE to be transferred back to the 5G network.

As such, a need exists to provide a system that can provide a single registration mode 5G capable user equipment (UE) with a 5G subscription, where the UE is automatically handed over to a 5G network once an IMS voice call is terminated for an enhanced user experience. The present disclosure can transfer the UE back to the 5G network after an EPS Fallback.

The present technology provides systems and method that can include receiving, at a mobility management entity, a voice call termination message from a serving gateway, determining, by the mobility management entity, whether the user equipment includes a 5G subscription and 5G capability based on the voice call termination message, and providing, by the mobility management entity, a handover message to the user equipment to initiate a handover to the 5G network based on the determining of whether the user equipment includes the 5G subscription and 5G capability.

As further described below, the disclosed technology provides systems, methods, and computer-readable media for providing transference of a 5G capable user equipment (UE) with a 5G subscription to a 5G network once an internet protocol multimedia subsystem ("IMS") voice call is terminated. Examples will be described herein using 5G/New Radio (NR) as an illustrative example. However, the systems and techniques are not limited to 5G and can be implemented using other wireless technologies such as next generation 6G networks and 4G Control and User Plane Separation (CUPS) architecture between SGWC-U and PGWC-U, as described herein. The present technology will be described in the subsequent disclosure as follows.

Figure 4:
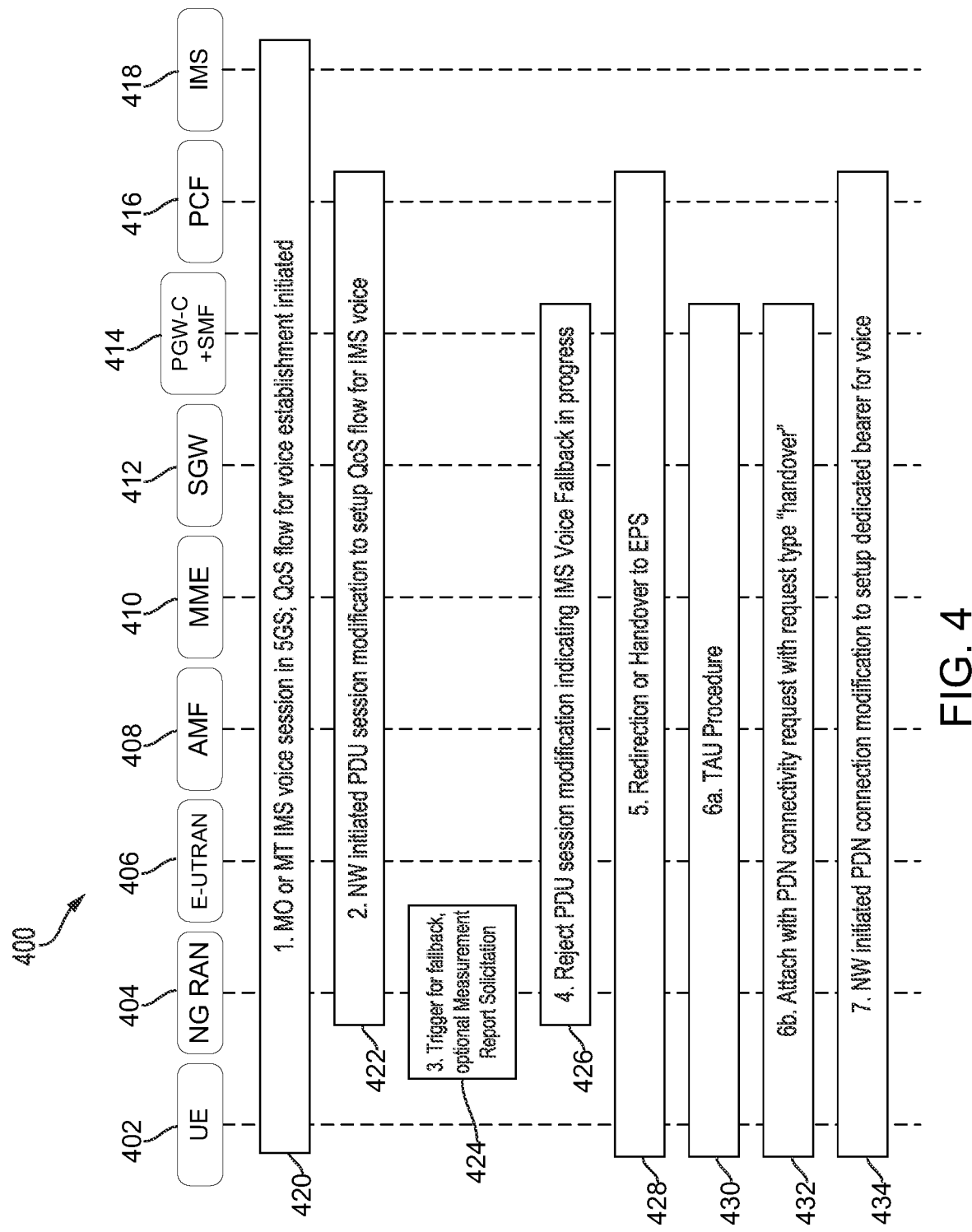
FIG. 4 illustrates an example sequence diagram of a process for enabling movement of a user equipment between 5G and 4G evolved packet core (EPC) networks, in accordance with some embodiments.

FIG. 4 illustrates an example sequence diagram of a process for enabling movement of a user equipment between 5G and 4G evolved packet core (EPC) networks 400, in accordance with some embodiments. A network architecture of process 400 can include a user equipment (UE) 402, a next generation (NG) radio access network (RAN) 404, an evolved-universal mobile telecommunications system terrestrial radio access network ("E-UTRAN") 406, an application and mobility management function ("AMF") 408, a 4G mobility management entity ("MME") 410, a serving gateway ("SGW") 412, a packet gateway control plane ("PGW-C") and a session management function (SMF) 414, a policy control function (PCF) 416, and internet protocol multimedia subsystem ("IMS") 418.

At step 420, the process 400 can include a mobile originated (MO) or a mobile terminated (MT) IMS voice session in a 5G system ("5GS") and a quality of service (QoS) flow for a voice establishment being initiated.

At step 422, the process 400 can include the network 400 initiating a protocol data unit (PDU) session modification to setup the QoS flow for the IMS voice call.

At step 424, the process 400 can include an optional measurement report solicitation including a trigger for fallback.

At step 426, the process 400 can include rejecting the PDU session modification indicating that the IMS voice fallback is in progress.

At step 428, the process 400 can include redirecting or handing over the UE to an evolved packet system (EPS).

At step 430, the process 400 can include implementing a tracking area update procedure.

At step 432, the process 400 can include attaching a packet data network (PDU) connectivity request with a request type "handover."

At step 434, the process 400 can include initiating, by the network 400, a PDN connection modification to setup a dedicated bearer for voice calls.

Figure 5:
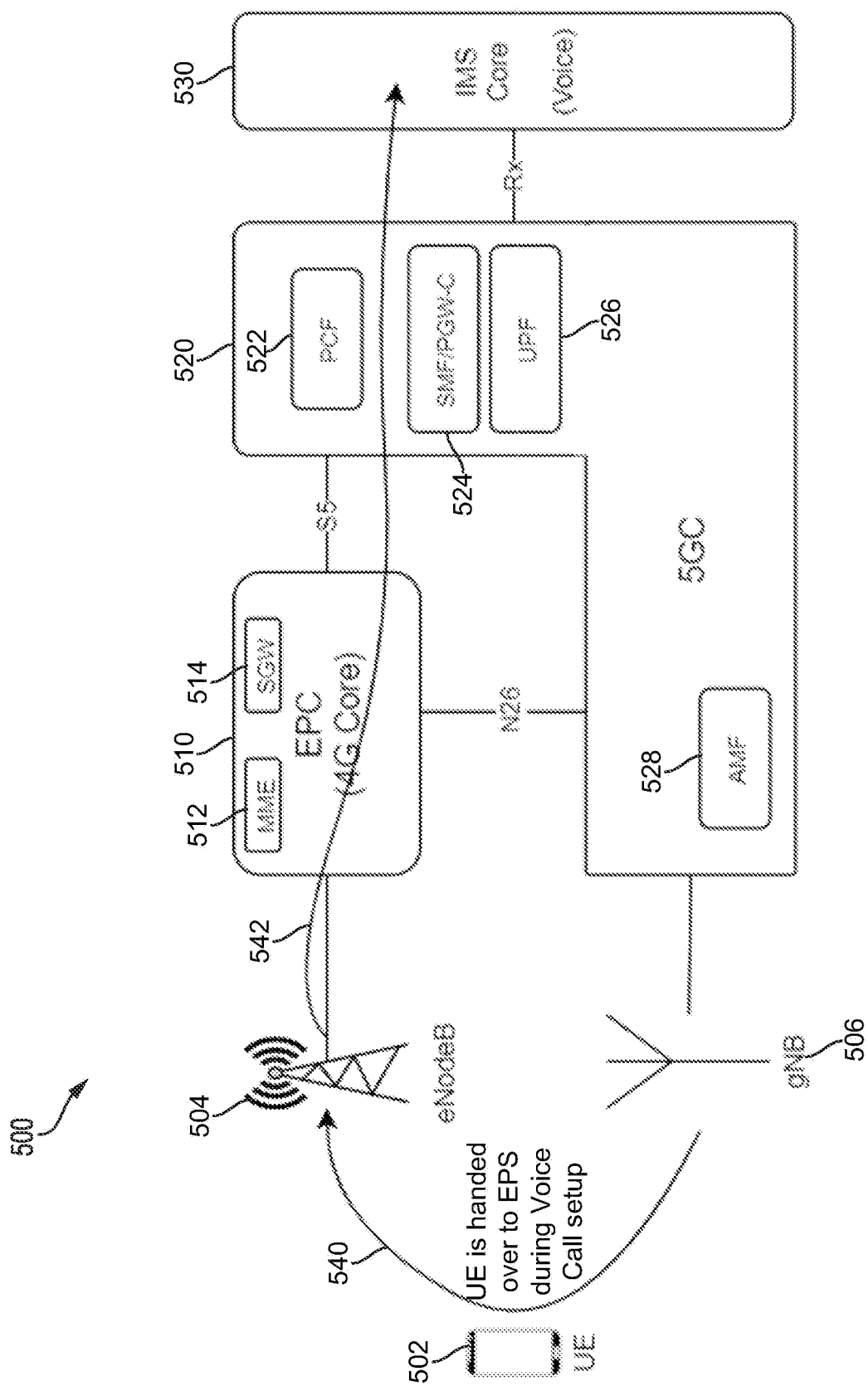
FIG. 5 illustrates an example block diagram of routing a user equipment (UE) to an evolved packet system (EPS) during voice call setup, in accordance with some embodiments.

FIG. 5 illustrates an example block diagram of routing a user equipment (UE) to an evolved packet core (EPC) during voice call setup, in accordance with some embodiments. The 5G and EPC network architectures 500 can include a user equipment (UE) 502, an evolved node B ("eNodeB") 504, a next generation node B ("gNB") 506, an evolved packet core (EPC) 510, a 5G core ("5GC") 520, and an internet protocol multimedia subsystem ("IMS") core 530. The EPC 510 may be a 4G core and include a 4G mobility management entity ("MME") 512 and a serving gateway ("SGW") 514. The 5GC 520 can include a policy control function (PCF) 522, a packet gateway control plane ("PGW-C") and a session management function (SMF) 524, a user plane function (UPF) 526, and an application and mobility management function ("AMY") 528.

In some implementations, the UE 502 to be communicatively coupled to the eNodeB 504 and/or the gNB 506. The eNodeB 504 can be communicatively coupled to the EPC 510 and the gNB 506 can be communicatively coupled to the 5GC 520. In some examples, the EPC 510 can communicate with the 5GC 520 via S5 and N26 interfaces. In other examples, the EPC 510 can be communicatively coupled to the IMS core 530. In some implementations, the EPC 510 (e.g., MME 512 and SGW 514) can be communicatively coupled to the IMS core 530 via the UPF 526 or the PGW(C/U) 524, in a CUPS example. In some examples, the UPF 526 (e.g., of the 5GC 520) can perform a similar function that the PGW-C 524 can perform in a 4G/CUPS configuration. As described herein, these functionalities can be merged into hybrid 4G and 5G networks so that both types of networks can handle 4G and 5G calls at the same time. In other implementations, a 4G call can be routed via the following path: from the UE 502, to the SGW 514, to the PGW 524, and to the IMS core 530. In some examples, a 5G call can be routed via the following path: from the UE 502, to the UPF 526, and to the IMS core 530 (e.g., via a data plane).

Referring to FIG. 5, the UE 502 can be handed over to an evolved packet system (EPS) (e.g., EPC 510) during a voice call setup. For example, in a 5G network, if Voice over New Radio (VoNR) is not supported due to the lack of radio resources, if all features for VoNR are not implemented by the UE, or if the UE is in an area where a new radio (NR) is not configured for voice calls, the voice call with handed over 540 to the EPC 510 to facilitate a voice call 542 via the IMS core 530. Previously, after the IMS voice call was terminated, the UE 502 would remain on the 4G network (e.g., EPC 510) and continue to stay there until the UE 502 initiated a Registration Request with the 5GC 530, rather than being initiated by the 4G network (e.g., EPC 510).

As different operators move from 4G to 5G, it may be beneficial to provide the best service available to a customer and automatically prioritize access to a 5G network when the customer has 5G capabilities and a 5G subscription. The present disclosure can provide a mechanism where a single registration mode 5G capable UE (e.g., UE 502), which has a 5G subscription, can be transferred back to the 5G network (e.g., 5GC 520) once an IMS voice call is terminated.

Figure 6:
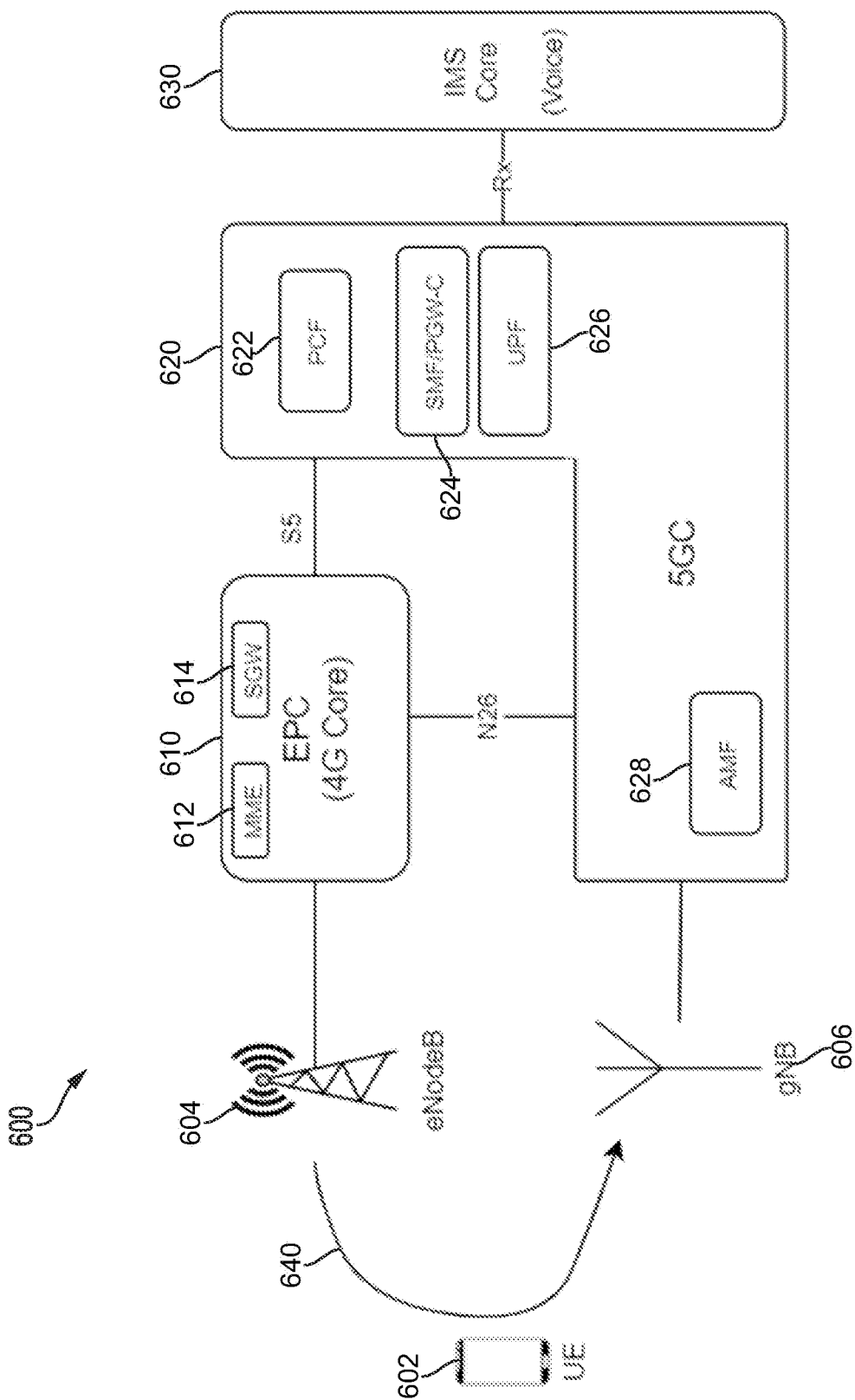
FIG. 6 illustrates an example block diagram of routing a user equipment (UE) to a 5G network upon termination of an IMS voice call, in accordance with some embodiments.

FIG. 6 illustrates an example block diagram of routing a user equipment (UE) to a 5G network upon termination of an internet protocol multimedia subsystem ("IMS") voice call, in accordance with some embodiments. The 5G and evolved packet system (EPC) network architectures 600 can include a user equipment (UE) 602, an evolved node B ("eNodeB") 604, a next generation node B ("gNB") 606, an evolved packet core (EPC) 610, a 5G core ("5GC") 620, and an internet protocol multimedia subsystem ("IMS") core 630. The EPC 610 may be a 4G core and include a 4G mobility management entity ("MME") 612 and a serving gateway ("SGW") 614. The 5GC 620 can include a policy control function (PCF) 622, a packet gateway control plane ("PGW-C") and a session management function (SMF) 624, a user plane function (UPF) 626, and an application and mobility management function ("AMY") 628.

In some implementations, the UE 602 to be communicatively coupled to the eNodeB 604 and/or the gNB 606. The eNodeB 604 can be communicatively coupled to the EPC 610 and the gNB 606 can be communicatively coupled to the 5GC 620. In some examples, the EPC 610 can communicate with the 5GC 620 via S5 and N26 interfaces. In other examples, the EPC 610 can be communicatively coupled to the IMS core 630.

In some implementations, after an IMS voice call has been terminated, the UE 602 can remain on the 4G network (e.g., EPC 610) until a registration procedure is initiated (e.g., by the UE 602). In other implementations, when the UE 602 is 5G subscribed (e.g., a 5G subscriber and 5G compatible) and in a 5G coverage area, the network architectures 600 can trigger the UE 602 to return 640 (e.g., handover) back to the 5GC 620.

In other implementations, the 5G (e.g., 5GC 620) and the EPC (e.g., EPC 610) network architectures 600 can enable movement of UEs (e.g., UE 602) between a 5G stand alone (SA) network (e.g., 5GC 620) and an EPC network (e.g., EPC 610) by utilizing an N26 interface, similar to an S10 interface between different MMES. The N26 interface can be an inter-core network (CN) interface between the MME 612 of the EPC 610 and the AMF 628 of the 5GC 620 to enable interworking between the EPC 610 and the 5GC 620. The N26 interface can provide seamless mobility between 5G SA network (e.g., the 5GC 620) and the EPC network (e.g., EPC 610).

Figure 7:
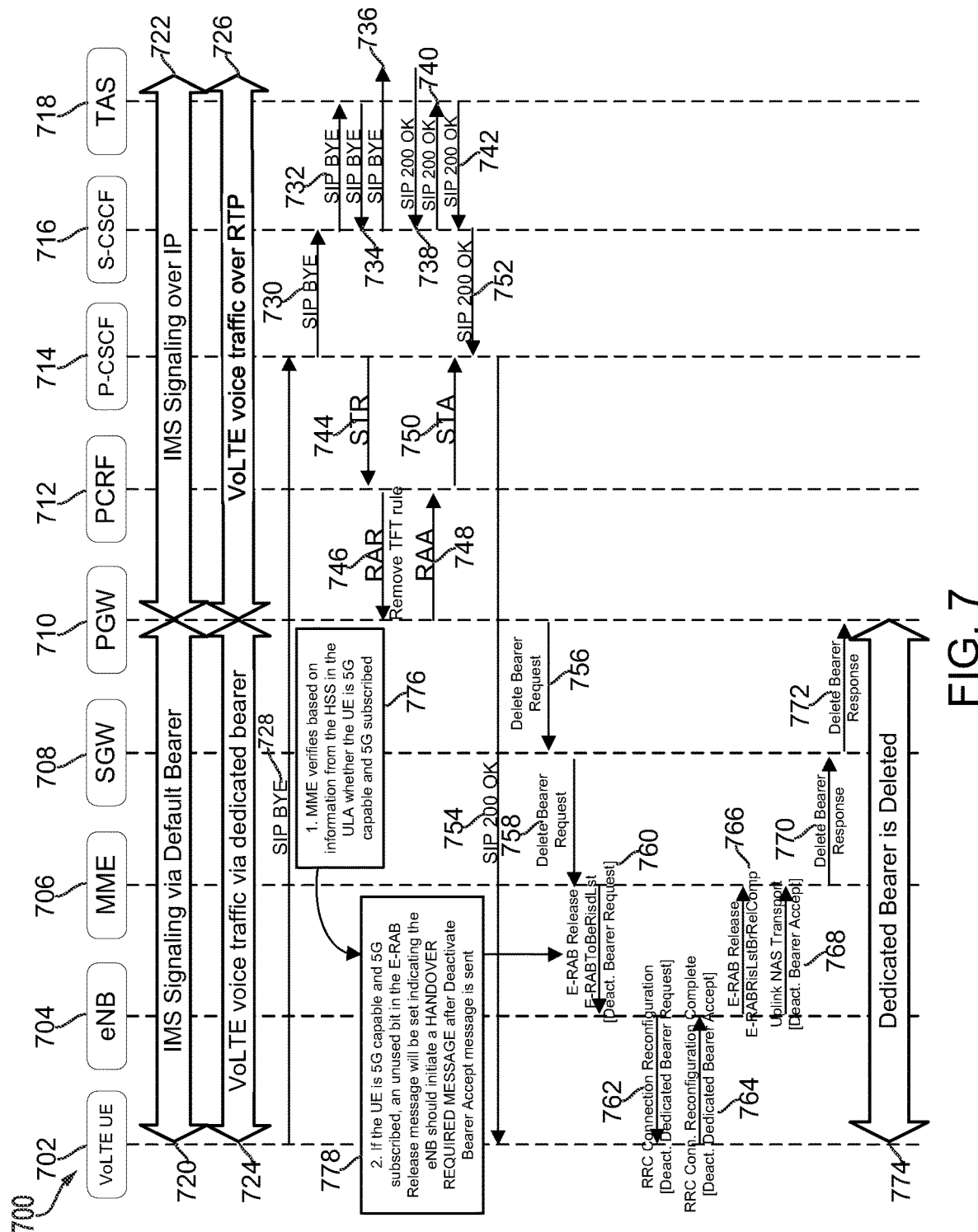
FIG. 7 illustrates an example sequence diagram of a process for providing transference of a 5G capable user equipment (UE) with a 5G subscription to a 5G network once an internet protocol multimedia subsystem ("IMS") voice call is terminated, in accordance with some embodiments.

FIG. 7 illustrates an example sequence diagram of a process for providing transference of a 5G capable user equipment (UE) with a 5G subscription to a 5G network once an internet protocol multimedia subsystem ("IMS") voice call is terminated 700, in accordance with some embodiments. A network architecture of the process 700 can include a voice over long term evolution (VoLTE) user equipment (UE) 702, an evolved node B (eNB) 704, a 4G mobility management entity ("MME") 706, a serving gateway ("SGW") 708, a packet gateway ("PGW") 710, a policy and charging rules function (PCRF) 712, a proxy-call session control function (P-CSCF) 714, a serving-call session control function (P-CSCF) 716, and a telephony application server (TAS) 718.

At step 720, the process 700 can include providing IMS signaling between the VoLTE UE 702 and the PGW 710 via a default bearer.

At step 722, the process 700 can include providing IMS signaling between the PGW 710 and the TAS 718 over internet protocol (IP).

At step 724, the process 700 can include providing VoLTE voice traffic between the VoLTE UE 702 and the PGW 710 via a dedicated bearer.

At step 726, the process 700 can include providing VoLTE voice traffic between the PGW 710 and the TAS 718 over real time transport protocol ("RTP").

At step 728, the process 700 can include the VoLTE UE 702 providing a session initiation protocol (SIP) BYE request (e.g., to terminate a call) to the P-CSCF 714.

At step 730, the process 700 can include the P-CSCF 714 providing a SIP BYE request to the S-CSCF 716.

At step 732, the process 700 can include the S-CSCF 716 providing a SIP BYE request to the TAS 718.

At step 734, the process 700 can include the TAS 718 providing a SIP BYE request to the S-CSCF 716.

At step 736, the process 700 can include the S-CSCF 716 providing a SIP BYE request.

At step 738, the process 700 can include the S-CSCF 716 receiving a SIP 200 OK message (e.g., a message indicating that a request was successful).

At step 740, the process 700 can include the S-CSCF 716 providing a SIP 200 OK message to the TAS 718.

At step 742, the process 700 can include the TAS 718 providing a SIP 200 OK message to the S-CSCF 716.

At step 744, the process 700 can include the P-CSCF 714 providing a session-termination-request (STR) command to the PCRF 712.

At step 746, the process 700 can include the PCRF 712 providing a Re-Auth-Request (RAR) command to the PGW 710 to remove a traffic flow template (TFT) rule.

At step 748, the process 700 can include the PGW 710 providing a re-auth-answer (RAA) command to the PCRF 712.

At step 750, the process 700 can include the PCRF 712 providing a session-termination-answer (STA) command to the P-CSCF 714.

At step 752, the process 700 can include the S-CSCF 716 providing a SIP 200 OK message to the P-CSCF 714.

At step 754, the process 700 can include the P-CSCF 714 providing a SIP 200 OK message to the VoLTE UE 702.

At step 756, the process 700 can include the PGW 710 providing a delete bearer request 756 to the SGW 708.

At step 758, the process 700 can include the SGW 708 providing a delete bearer request 758 to the MME 706.

At step 760, the process 700 can include the MME 706 providing an EPS radio access bearer ("E-RAB") release (e.g., an E-RABToBeRisdLst, deactivating a bearer request) to the eNB 704.

At step 762, the process 700 can include the eNB 704 providing a radio resource control (RRC) connection reconfiguration request (e.g., a deactivating dedicated bearer request) to the VoLTE UE 702.

At step 764, the process 700 can include the VoLTE UE 702 providing an RRC connection reconfirmation complete message (e.g., a deactivating dedicated bearer accept message) to the eNB 704.

At step 766, the process 700 can include the eNB 704 providing an E-RAB release message (e.g., E-RABRisLst-BrRelComp) to the MME 706.

At step 768, the process 700 can include the eNB 704 providing an uplink non-access stratum (NAS) transport message (e.g., a deactivating bearer accept message) to the MME 706.

At step 770, the process 700 can include the MME 706 providing a delete bearer response to the SGW 708.

At step 772, the process 700 can include the SGW 708 providing a delete bearer response to the PGW 710.

At step 774, the process 700 can include a dedicated bearer being deleted between the VoLTE UE 702 and the PGW 710.

At step 776, the process 700 can include the MME 706 determining, based on information from a home subscriber server (HSS) in an Update Location Answer (ULA), whether the VoLTE UE 702 is 5G capable and/or a 5G subscriber/subscribed. In some implementations, a Core-Network-Restrictions attribute-value-pair (AVP) may be set to a value other than 1 (e.g., where 5GC may not be allowed). In some examples, the process 700 can include determining whether the VoLTE UE is 5G capable by utilizing an MME to check for UE Network Capability IE (e.g., n1-mode). For example, the determining of whether the VoLTE UE includes a 5G subscription can include utilizing AVPs of the ULA such as: Interworking-5GS-Indicator AVP, where the MME can support the Interworking-5GS-Indicator to indicate whether the interworking between a 5GS and an EPS is subscribed or not subscribed for an access point name (APN); Access-Restriction-Data AVP, where the MME can support a bit 10 NR in 5GS that may not be allowed to check whether the NR is 5GS allowed or not allowed; and Core-Network-restriction AVP, where the MME can support the Core-Network-Restrictions AVP to indicate types of Core Networks that are disallowed for a user (e.g., UE).

At step 778, the process 700 can include, if the VoLTE UE 702 is 5G capable and a 5G subscriber/subscribed, the MME 706 can utilize an unused bit in the E-RAB Release message (e.g., E-RAB release message 760) to indicate that the eNB 704 can initiate a HANDOVER REQUIRED MESSAGE (e.g., back to the 5GC) after the deactivate bearer accept message 768 is providing from the eNB 704 to the MME 706. In some implementations, when an N26 interface is available, a 5G handover can be triggered to return the UE back to the 5GC after an IMS call termination occurs. The 5G handover may be facilitated by the UE including a 5GC subscription. In some examples, the MME can also determine whether the UE is 5G capable based on UE network capability. For a UE that can support an N1 mode, the UE can set the N1 mode bit to an N1 mode in a UE network capability IE message (e.g., ATTACH REQUEST/TRACKING AREA UPDATE REQUEST).

In some implementations, the MME 706 can trigger the E-RAB release/deactivate bearer message 760 with an additional or replacement trigger that indicates to the eNB 704 to perform a handover of the VoLTE UE 702 to 5GC with a cause, e.g., an "N26 interface available-trigger 5G handover." The eNB 702 can trigger the handover procedure as described herein.

In other implementations, as the MME 706 can have subscriber (e.g., VoLTE UE 702) information received previously from an HSS and/or a unified data management (UDM) in a ULA message (e.g., during an EPC initial attach). The MME 706 can be aware that the VoLTE UE 702 is 5GC capable and subscribed. The process 700 can utilize this information and upon receiving a Delete Bearer Request (e.g., step 758 of process 700) from the SGW 708 (e.g., during a voice call termination and bearer clearance), the MME 706 can provide a notification to the eNodeB (e.g., eNB 702) to initiate an evolved packet system (EPS) to 5GS handover.

In some examples, the MME 706 can establish a new mechanism to cross-check subscriber capabilities (e.g., whether the subscriber is 5GC capable and subscribed) in its own database/context (e.g., EPC) when a Delete Bearer Request (e.g., step 758 of process 700) is received from the SGW 708, for a voice bearer.

In some implementations, the process 700 can directly trigger a handover based on code sent by the MME 706. For example, the trigger can effectively handover the VoLTE UE 702 to the 5GC immediately after an IMS voice call has been terminated. The code can be provided from the MME 706 to the eNB (e.g., VoLTE UE 702) when a subscriber is 5G subscribed and a 5G UE.

In other implementations, the VoLTE UE 702 can initiate a process of handover after an IMS voice call is terminated. In other examples, the MME 706 can initiate a process of handover after an IMS voice call is terminated as described herein, which further reduces the handover/processing time. The MME 706 can also determine, during an attach procedure, whether a subscriber has a 5G subscription (e.g., S6a) and a 5G capable device. This would allow the MME 706 to process decisions to move back to a 5GC more quickly. Other examples include utilizing an MME trigger handover using an un-used Bit in an E-RAB release message (e.g., step 760 of process 700), which can make the handover process much faster while, at the same time, removing dependencies from a radio access network (RAN).

Figure 8:
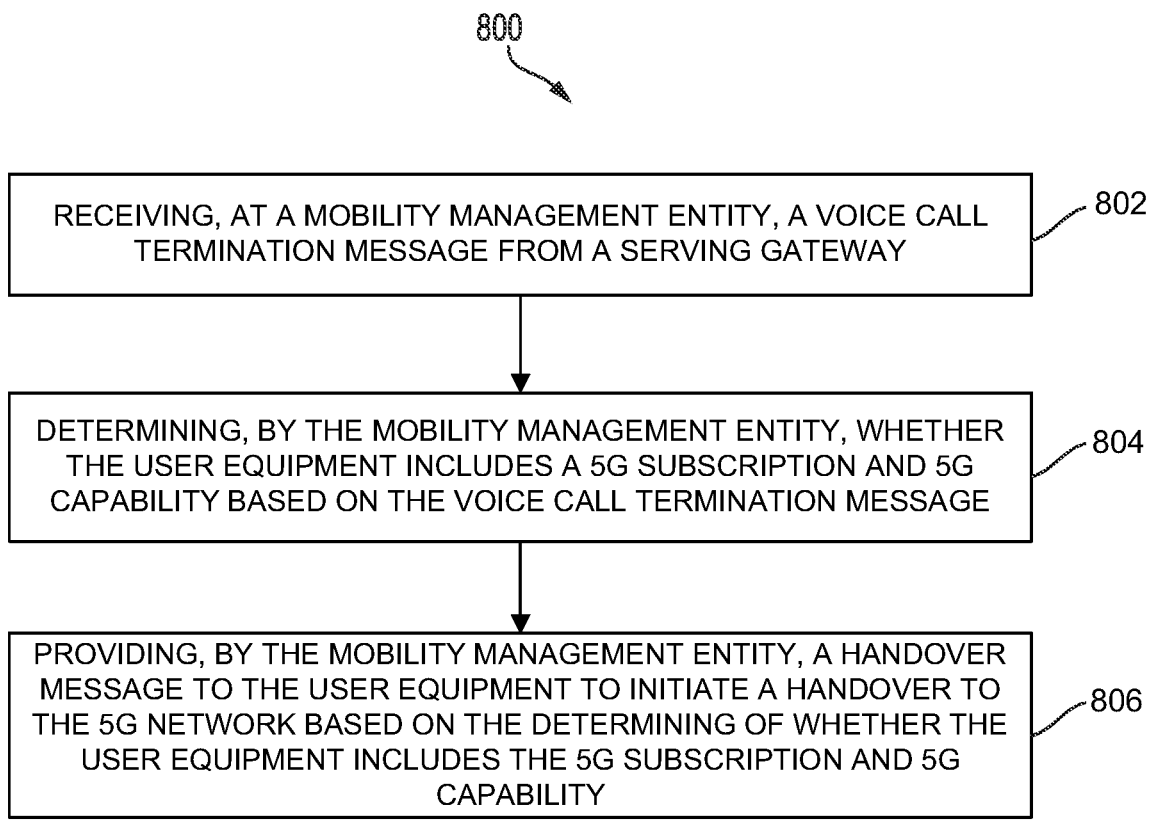
FIG. 8 illustrates an example process for providing transference of a 5G capable user equipment (UE) with a 5G subscription to a 5G network once an internet protocol multimedia subsystem ("IMS") voice call is terminated, in accordance with some embodiments.

Having disclosed some example system components and concepts, the disclosure now turns to FIG. 8, which illustrate example method 800 for providing transference of a 5G capable user equipment (UE) with a 5G subscription to a 5G network once an internet protocol multimedia subsystem ("IMS") voice call is terminated. The steps outlined herein are exemplary and can be implemented in any combination thereof, including combinations that exclude, add, or modify certain steps.

At step 802, the method 800 can include receiving, at a mobility management entity, a voice call termination message from a serving gateway. The voice call termination message is a delete bearer request received from the serving gateway.

At step 804, the method 800 can include determining, by the mobility management entity, whether the user equipment includes a 5G subscription and 5G capability based on the voice call termination message. The determining of whether the user equipment includes the 5G subscription and 5G capability can comprise verifying the 5G subscription and 5G capability of the user equipment with a home subscriber server associated with a user license agreement of the user equipment.

At step 806, the method 800 can include providing, by the mobility management entity, a handover message to the user equipment to initiate a handover to the 5G network based on the determining of whether the user equipment includes the 5G subscription and 5G capability. The handover message to the user equipment can be an evolved packet system radio access bearer message. The method 800 can further include utilizing, by the mobility management entity, an unused bit of the evolved packet system radio access bearer message to initiate the handover of the user equipment to the 5G network. The handover message to the user equipment can include instructions to initiate the handover of the user equipment to the 5G network after a deactivate bearer accept message is provided. The handover message to the user equipment can include an N26 interface available-trigger 5G handover message.

Figure 9:
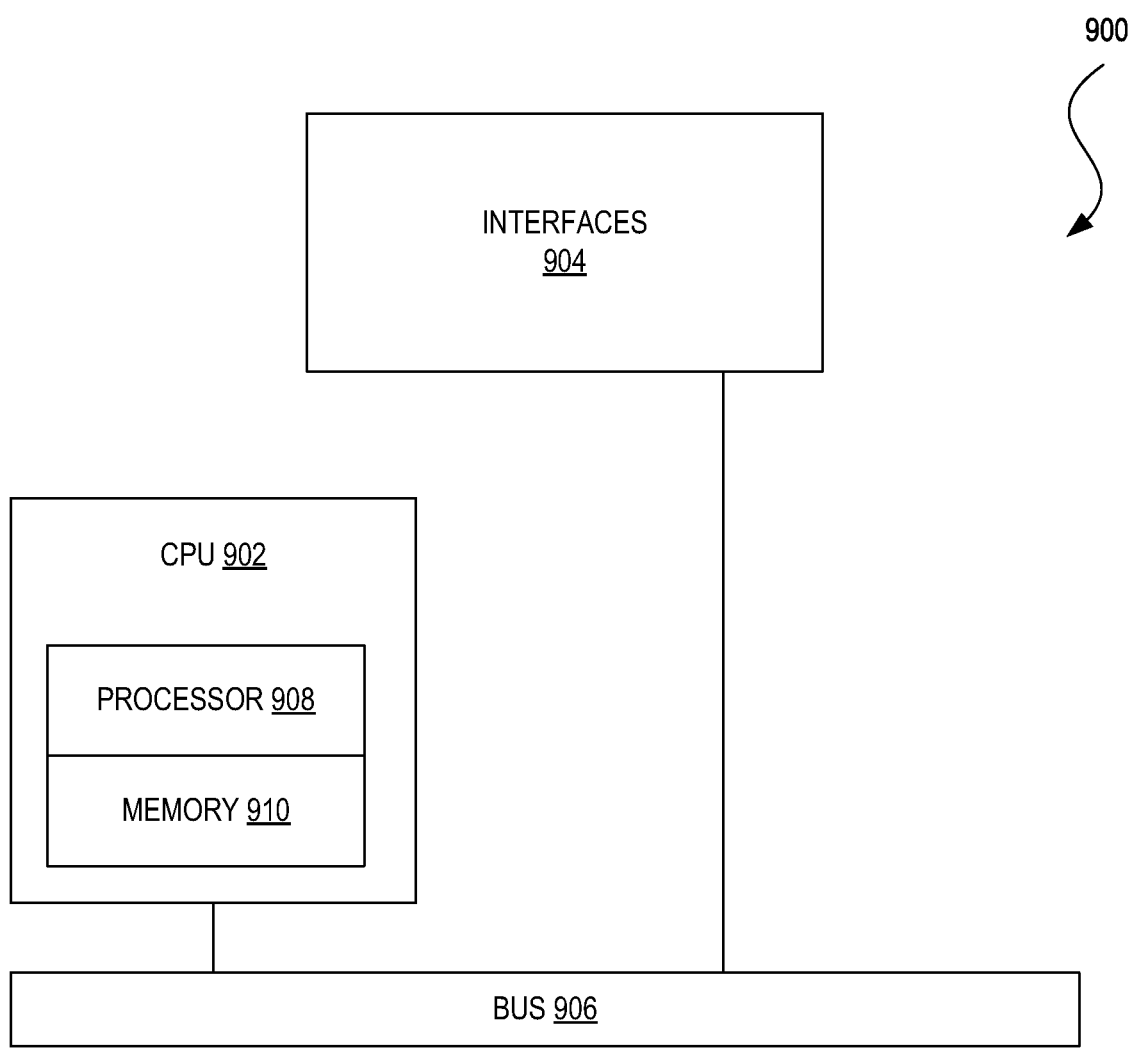
FIG. 9 illustrates an example of a network device, in accordance with some embodiments.

FIG. 9 further illustrates an example of a network device 900 (e.g., switch, router, network appliance, etc.). The network device 900 can include a master central processing unit (CPU) 902, interfaces 904, and a bus 906 (e.g., a PCI bus). When acting under the control of appropriate software or firmware, the CPU 902 can be responsible for executing packet management, error detection, and/or routing functions. The CPU 902 preferably accomplishes all these functions under the control of software including an operating system and any appropriate applications software. The CPU 902 may include one or more processors 908 such as a processor from the Motorola family of microprocessors or the MIPS family of microprocessors. In an alternative embodiment, the processor 908 can be specially designed hardware for controlling the operations of the network device 900. In an embodiment, a memory 910 (such as non-volatile RAM and/or ROM) can also form part of the CPU 902. However, there are many different ways in which memory could be coupled to the system.

An enterprise network can address the above and other security requirements with certain enhancements. For example, the enterprise network can create an International Mobile Subscriber Identity (IMSI) whitelist in in an Authentication, Authorization, and Accounting (AAA) server. In addition to SIM authentication, the enterprise network can maintain the AAA server containing the IMSIs of enterprise-provisioned devices. After initial authentication, a Packet Data Network Gateway (PGW) can validate the IMSI with the local device. The enterprise can also create a mapping of IMSIs to International Mobile Equipment Identities (IMEIs) for (non-embedded) SIM cards. The cloud-hosted authentication system can maintain a mapping between IMSIs and IMEIs. This mapping can be controlled by the enterprise network. This can ensure a binding between device and SIM. After authentication, the mobile core can request the IMEI. It can further check if the IMEI maps to IMSI. The enterprise network can also deploy Virtual Routing and Forwarding (VRFs) instances based on device policy. The PGW can tunnel user traffic to specific VRFs.

The interfaces 904 can be provided as interface cards (sometimes referred to as line cards). The interfaces 904 can control the sending and receiving of data packets over the network and sometimes support other peripherals used with the network device 900. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 904 may include ports appropriate for communication with the appropriate media. In some cases, the interfaces 904 may also include an independent processor and, in some instances, volatile RAM. The independent processors may control communication intensive tasks such as packet switching, media control, and management. By providing separate processors for the communication intensive tasks, the interfaces 904 may allow the CPU 902 to efficiently perform routing computations, network diagnostics, security functions, and so forth.

Although the system shown in FIG. 9 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 900.

Regardless of the network device's configuration, it may employ one or more memories or memory modules (including the memory 910) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 10A:
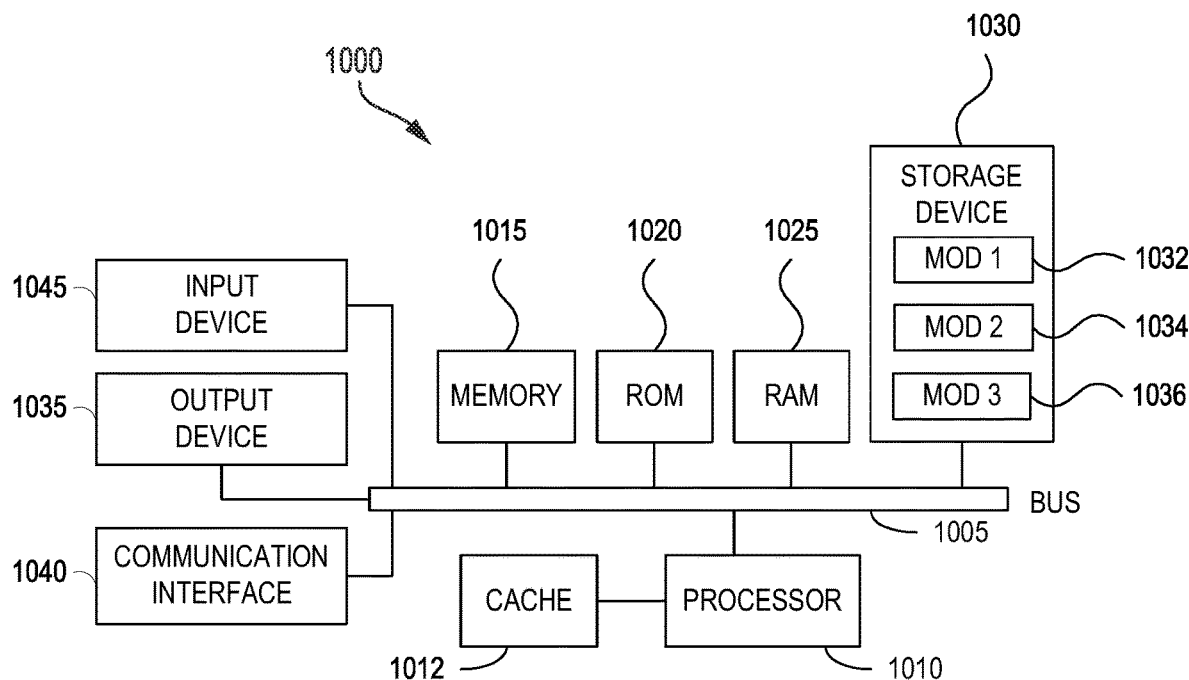
FIGS. 10A and 10B illustrate examples of systems, in accordance with some embodiments.
Figure 10B:
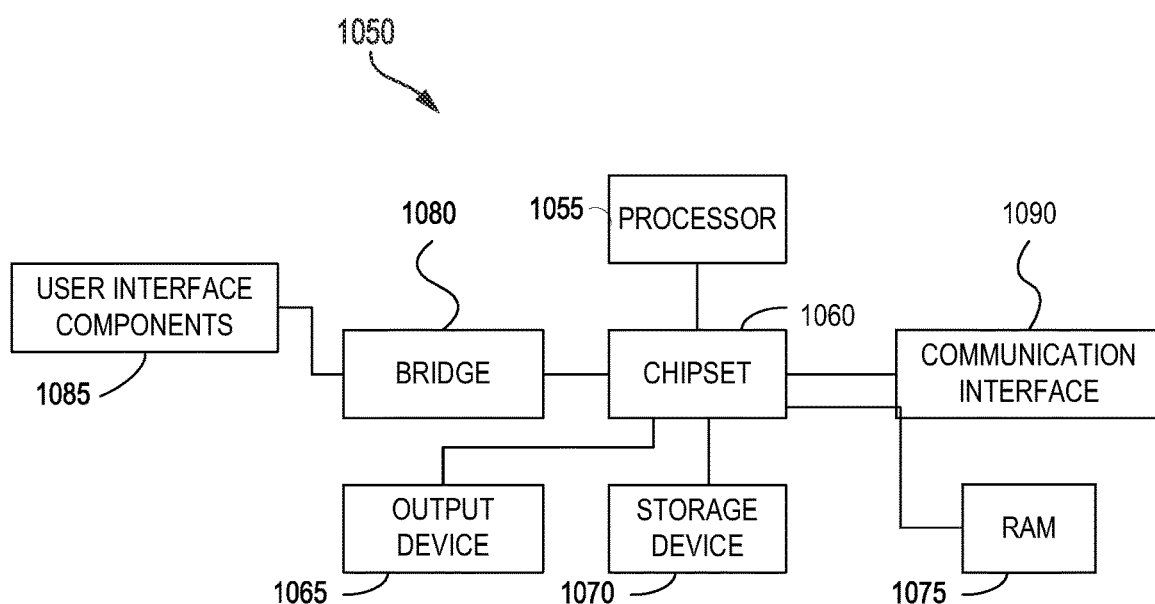

FIGS. 10A and 10B illustrate systems in accordance with various embodiments. The more appropriate system will be apparent to those of ordinary skill in the art when practicing the various embodiments. Persons of ordinary skill in the art will also readily appreciate that other systems are possible.

FIG. 10A illustrates an example of a bus computing system 1000 wherein the components of the system are in electrical communication with each other using a bus 1005. The computing system 1000 can include a processing unit (CPU or processor) 1010 and a system bus 1005 that may couple various system components including the system memory 1015, such as read only memory (ROM) 1020 and random access memory (RAM) 1025, to the processor 1010. The computing system 1000 can include a cache 1012 of high-speed memory connected directly with, in close proximity to, or integrated as part of the processor 1010. The computing system 1000 can copy data from the memory 1015, ROM 1020, RAM 1025, and/or storage device 1030 to the cache 1012 for quick access by the processor 1010. In this way, the cache 1012 can provide a performance boost that avoids processor delays while waiting for data. These and other modules can control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in the storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing system 1000, an input device 1045 can represent any number of input mechanisms, such as a microphone for speech, a touch-protected screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing system 1000. The communications interface 1040 can govern and manage the user input and system output. There may be no restriction on operating on any particular hardware arrangement and therefore the basic features here may easily be substituted for improved hardware or firmware arrangements as they are developed.

The storage device 1030 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 1030 can include the software modules 1032, 1034, 1036 for controlling the processor 1010. Other hardware or software modules are contemplated. The storage device 1030 can be connected to the system bus 1005. In some embodiments, a hardware module that performs a particular function can include a software component stored in a computer-readable medium in connection with the necessary hardware components, such as the processor 1010, bus 1005, output device 1035, and so forth, to carry out the function.

FIG. 10B illustrates an example architecture for a chipset computing system 1050 that can be used in accordance with an embodiment. The computing system 1050 can include a processor 1055, representative of any number of physically and/or logically distinct resources capable of executing software, firmware, and hardware configured to perform identified computations. The processor 1055 can communicate with a chipset 1060 that can control input to and output from the processor 1055. In this example, the chipset 1060 can output information to an output device 1065, such as a display, and can read and write information to storage device 1070, which can include magnetic media, solid state media, and other suitable storage media. The chipset 1060 can also read data from and write data to RAM 1075. A bridge 1080 for interfacing with a variety of user interface components 1085 can be provided for interfacing with the chipset 1060. The user interface components 1085 can include a keyboard, a microphone, touch detection and processing circuitry, a pointing device, such as a mouse, and so on. Inputs to the computing system 1050 can come from any of a variety of sources, machine generated and/or human generated.

The chipset 1060 can also interface with one or more communication interfaces 1090 that can have different physical interfaces. The communication interfaces 1090 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 1055 analyzing data stored in the storage device 1070 or the RAM 1075. Further, the computing system 1050 can receive inputs from a user via the user interface components 1085 and execute appropriate functions, such as browsing functions by interpreting these inputs using the processor 1055.

It will be appreciated that computing systems 1000 and 1050 can have more than one processor 1010 and 1055, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for providing transference of a user equipment to a 5G network when a voice call is terminated, the computer-implemented method comprising:
    determining, by a mobility management entity, whether the user equipment includes a 5G subscription based on a voice call termination message; and
    based on the determining of whether the user equipment includes the 5G subscription, utilizing, by the mobility management entity, an unused bit of an evolved packet system radio access bearer message to initiate a handover of the user equipment to the 5G network.

2. The computer-implemented method of claim 1, wherein the voice call termination message is a delete bearer request received from a serving gateway.

3. The computer-implemented method of claim 1, wherein determining of whether the user equipment includes a 5G subscription comprises verifying the 5G subscription of the user equipment with a home subscriber server associated with a user license agreement of the user equipment.

4. The computer-implemented method of claim 1, wherein the handover message to the user equipment is the evolved packet system radio access bearer message.

5. The computer-implemented method of claim 4, further comprising utilizing, by the mobility management entity, the unused bit of the evolved packet system radio access bearer message to initiate the handover of the user equipment to the 5G network.

6. The computer-implemented method of claim 1, wherein the handover message to the user equipment includes instructions to initiate the handover of the user equipment to the 5G network after a deactivate bearer accept message is provided.

7. The computer-implemented method of claim 1, wherein the handover message to the user equipment includes an N26 interface available-trigger 5G handover message.

8. A system for providing transference of a user equipment to a 5G network when a voice call is terminated, the system comprising:
    one or more processors; and
    at least one computer-readable storage medium having stored therein instructions which, when executed by the one or more processors, cause the system to:
    determine, by a mobility management entity, whether the user equipment includes a 5G subscription based on a voice call termination message; and
    based on the determining of whether the user equipment includes the 5G subscription, utilize, by the mobility management entity, an unused bit of an evolved packet system radio access bearer message to initiate a handover of the user equipment to the 5G network.

9. The system of claim 8, wherein the voice call termination message is a delete bearer request received from a serving gateway.

10. The system of claim 8, wherein the determination of whether the user equipment includes a 5G subscription comprises verifying the 5G subscription of the user equipment with a home subscriber server associated with a user license agreement of the user equipment.

11. The system of claim 8, wherein the handover message to the user equipment is the evolved packet system radio access bearer message.

12. The system of claim 11, wherein the instructions which, when executed by the one or more processors, cause the system to utilize, by the mobility management entity, the unused bit of the evolved packet system radio access bearer message to initiate the handover of the user equipment to the 5G network.

13. The system of claim 8, wherein the handover message to the user equipment includes instructions to initiate the handover of the user equipment to the 5G network after a deactivate bearer accept message is provided.

14. The system of claim 8, wherein the handover message to the user equipment includes an N26 interface available-trigger 5G handover message.

15. A non-transitory computer-readable storage medium comprising:
    instructions stored on the non-transitory computer-readable storage medium, the instructions, when executed by one or more processors, cause the one or more processors to:
    determine, by a mobility management entity, whether a user equipment includes a 5G subscription based on a voice call termination message; and
    based on the determining of whether the user equipment includes the 5G subscription, utilize, by the mobility management entity, an unused bit of an evolved packet system radio access bearer message to initiate a handover of the user equipment to a 5G network.

16. The non-transitory computer-readable storage medium of claim 15, wherein the voice call termination message is a delete bearer request received from a serving gateway.

17. The non-transitory computer-readable storage medium of claim 15, wherein the determination of whether the user equipment includes a 5G subscription comprises verifying the 5G subscription of the user equipment with a home subscriber server associated with a user license agreement of the user equipment.

18. The non-transitory computer-readable storage medium of claim 15, wherein the handover message to the user equipment is the evolved packet system radio access bearer message.

19. The non-transitory computer-readable storage medium of claim 18, wherein the instructions, when executed by the one or more processors, cause the one or more processors to utilize, by the mobility management entity, the unused bit of the evolved packet system radio access bearer message to initiate the handover of the user equipment to the 5G network.

20. The non-transitory computer-readable storage medium of claim 15, wherein the handover message to the user equipment includes an N26 interface available-trigger 5G handover message.

* * * * *